United States Patent [19]

Bush

[11] Patent Number: 4,789,240

[45] Date of Patent: Dec. 6, 1988

[54] WAVELENGTH SWITCHED PASSIVE INTERFEROMETRIC SENSOR SYSTEM

[75] Inventor: Ira J. Bush, Los Angeles, Calif.

[73] Assignee: Litton Systems, Inc., Beverly Hills, Calif.

[21] Appl. No.: 738,620

[22] Filed: May 28, 1985

[51] Int. Cl.$^4$ .............................................. G01B 9/02
[52] U.S. Cl. .................................................. 356/345
[58] Field of Search ................. 356/345, 349; 250/227

[56] References Cited

U.S. PATENT DOCUMENTS

| | | |
|---|---|---|
| 3,990,036 | 11/1976 | Savit . |
| 4,360,272 | 11/1982 | Schmadel et al. . |
| 4,368,981 | 1/1983 | Ozeki ............................. 356/349 X |
| 4,443,700 | 4/1984 | Macedo et al. . |
| 4,505,587 | 3/1985 | Haus et al. . |
| 4,552,457 | 11/1985 | Giallorenzi et al. ............ 356/349 X |
| 4,588,296 | 5/1986 | Cahill et al. . |
| 4,606,020 | 8/1986 | Ruffin ..................................... 370/3 |
| 4,632,551 | 12/1986 | Pavlath .............................. 356/345 |

FOREIGN PATENT DOCUMENTS

| | | |
|---|---|---|
| 2096762 | 10/1982 | United Kingdom . |
| 83/03684 | 4/1982 | World Int. Prop. O. . |
| 83/02496 | 1/1983 | World Int. Prop. O. . |
| 85/00221 | 6/1983 | World Int. Prop. O. . |

OTHER PUBLICATIONS

"Passive Multiplexing Techniques for Fiber Optic Sensor Systems", Nelson et al., I.F.O.C., 3/1981, pp. 27–30.
Dandridge et al., "Phase Compensation in Interferometric Fiber Optic Sensors", Optics Letters, vol. 7, No. 6, Jun. 1982, pp. 279–281.

Primary Examiner—Vincent P. McGraw
Assistant Examiner—S. A. Turner
Attorney, Agent, or Firm—John H. Lynn

[57] ABSTRACT

This invention includes a fiber optic interferometer having a reference arm isolated from a physical parameter being monitored and a sensing arm exposed to the physical parameter being monitored. The sensing arm produces changes in the relative phase of the optical signals propagating in the sensing and reference arms in response to changes in the physical parameter. The sensing and reference signals are combined to produce an interference pattern after the sensing signal has been exposed to the physical parameter being monitored. A frequency shifter changes the frequency of the optical signal input to the interferometer, which produces interference signals at two frequencies. The optical path difference of the sensing and reference arms for the two frequencies produces phase changes that are in quadrature, which permits the interference signal for one frequency to be expressed as a function of the cosine of the phase change and the interference signal for the other frequency to be expressed as a function of the sine of the phase change. A demodulation algorithm uses data from the two interference signals to calculate either the tangent or cotangent of the phase angle to determine the phase change in the sensing signal caused by changes in the parameter.

29 Claims, 7 Drawing Sheets

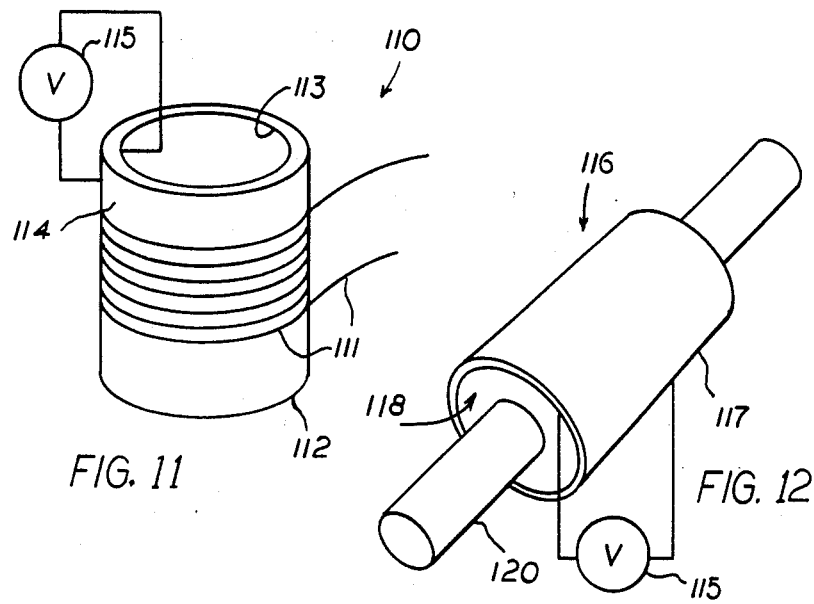
FIG. 11
FIG. 12
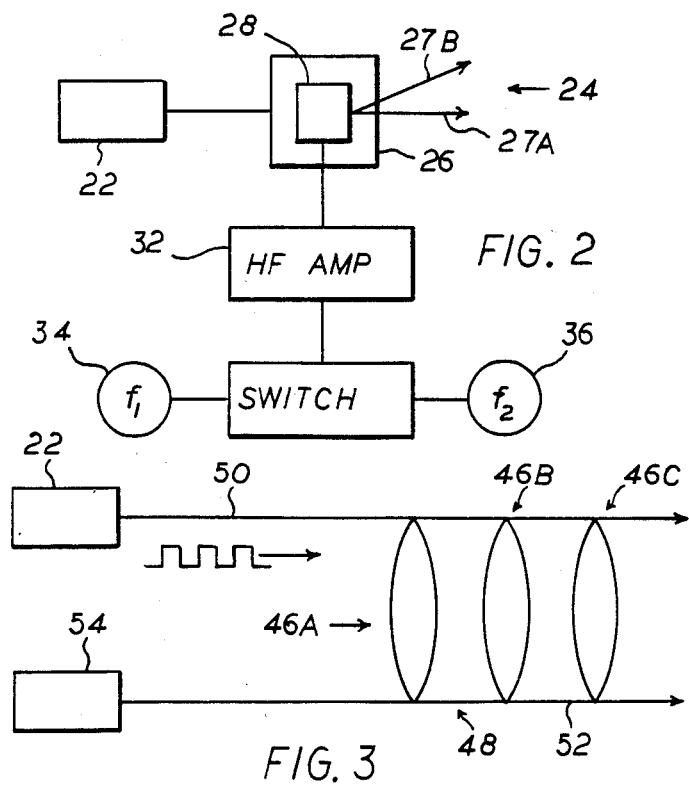
FIG. 2
FIG. 3

WAVELENGTH SWITCHED PASSIVE INTERFEROMETRIC SENSOR SYSTEM

BACKGROUND OF THE INVENTION

This invention relates generally to apparatus and methods for sensing physical phenomena and particularly to fiber optic sensors that use interferometers to sense changes in physical phenomena. Still more particularly, this invention relates to fiber optic interferometric sensors that respond to perturbations such as acoustic wavefronts by producing a phase difference in two light beams propagated by fiber optic material.

Optical fibers are sensitive to a large number of physical phenomena, such as acoustic waves and temperature fluctuations. An optical fiber exposed to such phenomena changes the amplitude, phase or polarization of light guided by the fiber. Optical fibers have been considered for use as sensing elements in devices such as hydrophones, magnetometers, accelerometers and electric current sensors.

Mach-Zehnder, Michelson, Sagnac, and resonant ring interferometers have been used as sensors. Mach-Zehnder, Michelson and Sagnac interferometers respond to the phenomenon being sensed by producing phase differences in interfering light waves. Detecting phase changes in the waves permits quantitative measurements to be made on the physical quantity being monitored. The Sagnac interferometer produces phase differences in two counter-propagating light waves in a coil of a single fiber in response to rotations about the axis of the coil.

The Mach-Zehnder interferometer is particularly sensitive to acoustic vibrations. A fiber optic Mach-Zehnder interferometer typically has a reference arm comprising a first length of optical fiber and a sensing arm comprising a second length of optical fiber. The sensing arm is exposed to a physical parameter, such as an acoustic wavefront, to be measured while the reference arm is isolated from changes in the parameter. When the Mach-Zehnder interferometer is used as an acoustic sensor, acoustic wavefronts change the optical length of the sensing arm as a function of the acoustic wave intensity. An optical coupler divides a light signal between the two arms. The signals are recombined after they have propagated through the reference and sensing arms, and the phase difference of the signals is monitored. Since the signals in the reference and sensing arms had a definite phase relation when they were introduced into the arms, changes in the phase difference are indicative of changes in the physical parameter to which the sensing arm was exposed.

A Michelson interferometer also has a sensing arm and a reference arm that propagate sensing and reference signals, respectively. However, in the Michelson interferometer these arms terminate in mirrors that cause the sensing and reference signals to traverse their respective optical paths twice before being combined to produce an interference pattern.

Arrays of acoustic sensors are used in various geophysical explorations and in antisubmarine warfare applications. Previous sensor arrays commonly used in such applications include a great many active sensors, which are expensive and difficult to operate, primarily because of the large number of wires required to activate the sensors and receive data therefrom.

U.S. patent application Ser. No. 619,119, filed June 1, 1984 by George A. Pavlath, assignee to Litton Systems, Inc., assignee of the present invention, describes an all-fiber optic sensor array that includes interferometric sensors. That application describes methods for supplying frequency modulated pulses and sequentially sampling the sensor outputs to determine responses of the individual sensors in the array to the physical parameters being monitored. The sampling technique for a Mach-Zehnder interferometer involves sequentially measuring the changes in the phase shifts of the signal for each sensor at a particular time and then repeating the measurements at a later time. The signals from each of the sensors have different transit times, which permits determination of the phase shift from each sensor independent of all the other sensors.

SUMMARY OF THE INVENTION

The present invention provides a passive fiber optic interferometric sensor system that overcomes difficulties and inconveniences encountered in the use of previously available active electrical systems for measuring physical parameters in geophysical exploration and other applications where physical changes in parameters being monitored affect the optical path length of an optical fiber. Being passive and, therefore, requiring no control apparatus, the present invention provides a sensor system that has fewer components than typical active systems.

A wavelength switched passive interferometric sensor system according to the present invention includes a fiber optic interferometer having a reference arm isolated from the physical parameter being monitored and a sensing arm exposed to the physical parameter being monitored. The invention further includes means for supplying optical signals to the reference and sensing arms. The sensing arm responds to changes in the physical parameter being monitored by producing a change in the relative phase of the optical signals propagating in the sensing and reference arms. The sensing and reference signals are combined to produce an interference pattern after the sensing signal has been exposed to the physical parameter being monitored. A detector monitors the interference pattern and produces detector output signals indicative of the phase difference between the sensing and reference signals. The phase difference information is digitized, sampled and stored.

The wavelength switched passive interferometric sensor system according to the present invention includes means for shifting the frequency of the optical input system such that the interferometer produces phase difference information for two different optical frequencies. The phase changes of signals propagated by the reference and sensing arms depend upon the changes in the parameter being monitored and the frequencies of the optical signals input to the interferometer. The system switches between the two frequencies so rapidly that there are no appreciable differences in the parameter during consecutive applications of the two signal frequencies to the interferometer. The frequency is preferably shifted while maintaining the amplitude of the optical signal constant, and the two frequencies of the optical signal are selected to produce phase changes that are in quadrature. The two signals of differing frequency may be contiguous so that the input to the interferometer is a single constant magnitude pulse having two different frequency components. The two signals may also comprise separate pulses that preferably are of the same amplitude.

The digitized detector output is processed by a demodulation algorithm to determine the phase change in the sensing signal, which is related to the changes in the parameter being monitored. A preferred demodulation algorithm determines the phase change by first calculating the tangent or cotangent of the phase angle and then looking up the corresponding angle in a table, which may conveniently be stored in a read only memory.

The wavelength switched passive interferometric sensor system according to the present invention preferably includes either a Bragg cell or a serrodyne system for shifting the frequency of the output of a coherent light source.

Optical signals preferably are provided to Mach-Zehnder or Michelson interferometers by way of evanescent field fiber optic directional couplers. Each Mach-Zehnder interferometer preferably comprises a sensing arm and a reference arm, both of which are preferably comprised of single mode optical fibers. The fibers comprising each Mach-Zehnder interferometer are included in an input directional coupler and an output directional coupler. The input directional coupler separates a signal from the frequency shifter into a reference signal and a sensing signal. The output directional coupler recombines the sensing and reference signals for input to the detector.

The Michelson interferometer includes a single fiber optic directional coupler that divides the beam from the light source into the reference signal and the sensing signal. Rather than including an output directional coupler to combine the reference and sensing signals, the fibers that form the reference and sensing arms of the Michelson interferometer have mirrored ends that reflect the signals back into the single directional coupler, where they recombine to produce an interference pattern.

BRIEF DESCRIPTION OF THE DRAWINGS

FIG. 2 is a schematic diagram of a Bragg cell that may be used with the wavelength switched passive interferometric sensor system of FIG. 1 to provide a wavelength switched signal input to the Mach-Zehnder interferometer;

FIG. 3 is a schematic diagram of a wavelength switched passive interferometric sensor system including a plurality of sensors arranged in a parallel array;

FIG. 11 is a simplified schematic diagram of a first serrodyne frequency shifting system that may be included in the system of FIG. 1 comprising an optical fiber wrapped around a thin-walled, radially poled piezoelelctric cylinder;

FIG. 12 is a simplified schematic diagram of a second serrodyne frequency shifting system including an optical fiber retained coaxially within a hollow piezoelectric cylinder filled with an incompressible liquid;

DESCRIPTION OF THE PREFERRED EMBODIMENT

System Components

Figure 1:
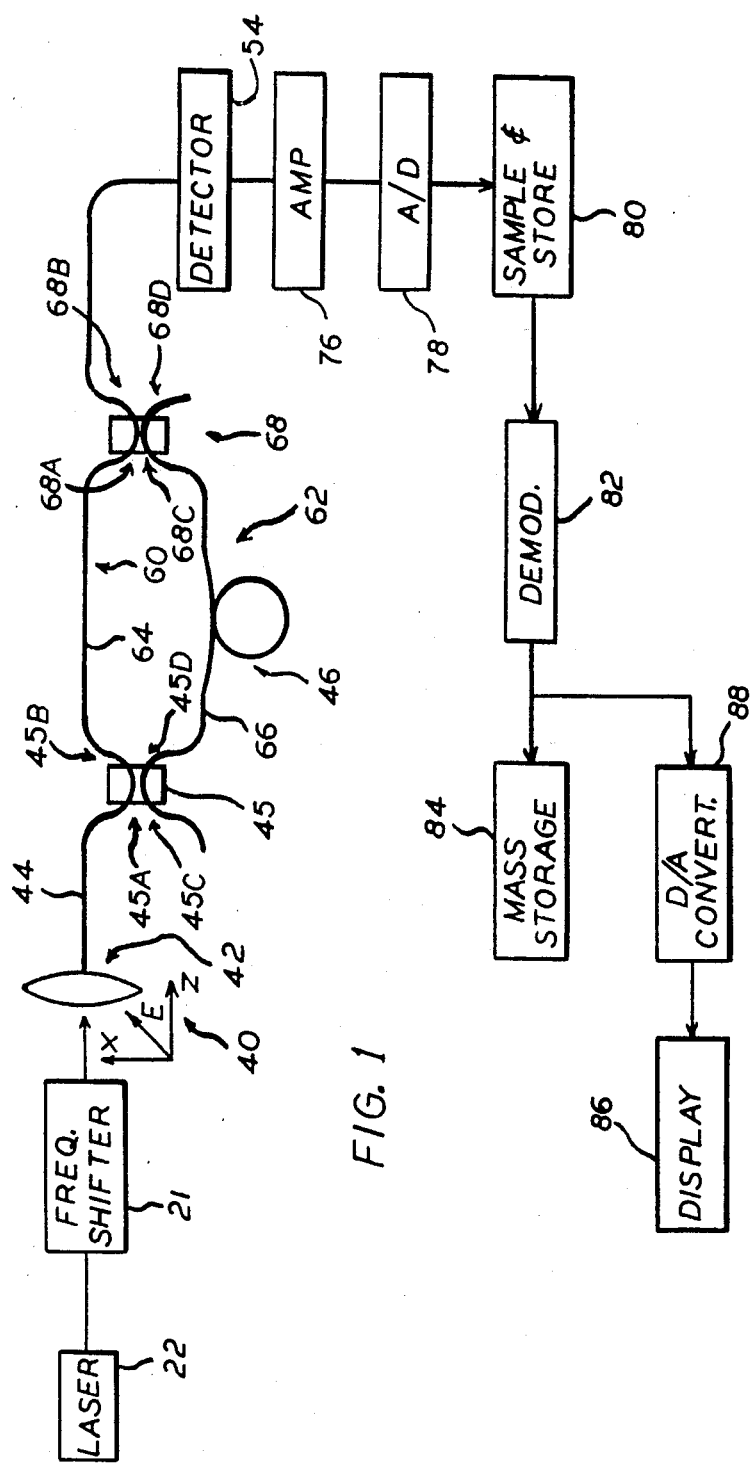
FIG. 1 is a schematic diagram of a wavelength switched passive interferometric sensor system according to the present invention including a Mach-Zehnder interferometer, signal input means, detector means and demodulator means for measuring the phase different of signal output from the Mach-Zehnder interferometer.

Referring to FIG. 1, an interferometric sensor system 20 includes a source of coherent optical energy, such as a laser 22. The output optical signal of the laser 22 impinges upon a frequency shifter 21, which selectively shifts the frequency of the optical signal. The frequency shifter 21 may be any suitable type of device for shifting the frequency of an optical signal. Exemplary preferred embodiments of the interferometric sensor system 20 include a Bragg cell or a serrodyne frequency shifting system shown in FIGS. 2 and 10-13, respectively.

Still referring to FIG. 1, the output of the frequency shifter 21 impinges upon a focusing optical system 40, which focuses an input signal on and end 42 of an optical fiber 44. An optical coupler 45, which is preferably an evanescent field coupler, receives the input optical signal at a port 45A and provides output signals at a pair of ports 45B and 45D to a suitable sensor, such as a Mach-Zehnder interferometer 46.

The interferometric sensor system 20 of FIG. 1 is greatly simplified in that it includes only the single Mach-Zehnder interferometric sensor 46. Referring to FIG. 3, an interferometric sensor system 20 may include a plurality of interferometric sensors 46A, 46B, etc. arranged in a parallel array 48 connected by suitable optical couplers 49 between an input fiber 50 and an output fiber 52. A detector 54 sequentially samples the output signals from the sensors 46A, 46B etc. to monitor changes in the physical parameters being sensed. The sensor arrays disclosed in U.S. patent application Ser. No. 619,119, filed June 1, 1984, now U.S. Pat. No. 4,632,551, by George A. Pavlath, hereby incorporated by reference herein, may also be included in the interferometric sensor system 20.

The Mach-Zehnder interferometer 46 includes a reference arm 60 and a sensing arm 62. The reference arm 60 is shown to include a length 64 of the optical fiber 44. The sensing arm 62 comprises a length of optical fiber 66, which is separate from the length of optical fiber 64 that comprises the reference arm 60. An optical coupler 45, which is preferably an evanescent field coupler, receives the input optical signal at a port 45A and provides output signals at a pair of ports 45B and 45D to a suitable sensor, such as a Mach-Zehnder interferometer 46. Other types of interferometric sensors, such as a Michelson interferometer described subsequently, may be included in the interferometric sensor system 20. However, the exemplary embodiment of the invention shown in FIG. 1 is described with reference to the Mach-Zehnder interferometer 46.

The signals propagated by the two lengths of optical fiber 64, 66 are input to a second optical coupler 68, which is preferably an evanescent field coupler similar to the coupler 45. The coupler 68 has ports 68A, 68B, 68C and 68D. Optical energy propagated by the sensing fiber 66 and the reference fiber 64 is input to ports 68A and 68C, respectively, of the coupler 68. The output of the Mach-Zehnder interferometer 46 emanates from port 68B for propagation to the detector 54.

The output of the Mach-Zehnder interferometer 46 is incident upon the detector 54, which preferably is a square law detector that responds to the intensity of light incident thereon to produce an electrical current. An amplifier 76 that is connected to the detector 74 amplifies the detector output current. An analog to digital converter 78 connected to the output of the amplifier 76 digitizes the amplified current, which is periodically sampled and stored by a sampling and storage device 80.

The data samples are demodulated by a demodulator 82 that is connected to the sampling and storage device 80. The demodulator 80 ascertains the phase difference between the light beam propagated by the reference arm 60 and the sensing arm 62. A mass storage memory 84 connected to the demodulator 82 stores the demodulated phase information in digital form. The phase information may be displayed on a suitable display device 86, which may conveniently be an oscilloscope connected to the demodulator 82 through a digital to analog converter 88.

The fiber optic components of the interferometric sensor system 20 will be described in detail before describing the method for determining the phase shift between the wave guided by the reference arm 60 and the wave guided by the sensing arm 62.

Optical Couplers

All of the optical couplers such as the couplers 45 and 68 may be of substantially identical structure; therefore, the following description of the optical coupler 45 is applicable to all optical couplers included in the interferometric sensor system 20 when the optical fibers 44 and 66 are single mode fibers. For multimode fiber implementations of the interferometric sensor system 20, suitable multimode couplers (not shown) are well-known in the art.

A fiber optic directional coupler suitable for use in single mode applications as the couplers 45, 68 of FIG. 1 and as the coupler of FIG. 3 is described in the Mar. 29, 1980 issue of *Electronics Letters*, Vol. 16, No. 16. pp. 260–261.

Figure 6:
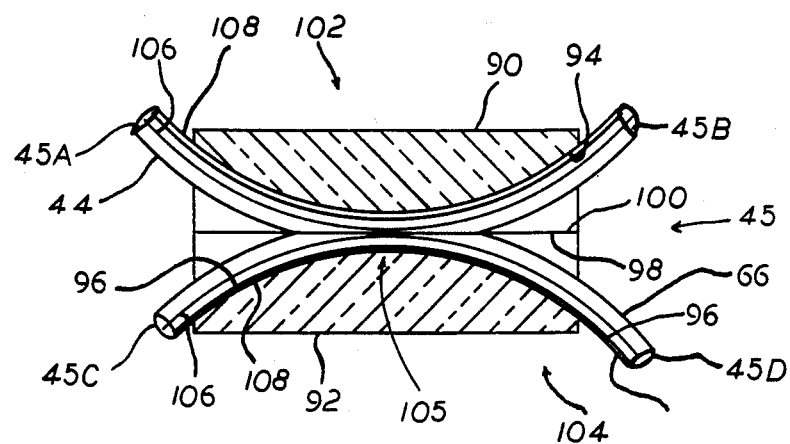
FIG. 6 is a cross sectional view of a fiber optic directional coupler shown in FIG. 1 for coupling optical signals between the Mach-Zehnder interferometer and other fiber optic components of the wavelength switched passive interferometric sensor of FIG. 1.

As illustrated in FIG. 6, the coupler 45 includes the optical fibers 44 and 66 of FIG. 1 mounted in a pair of substrates 90, 92, respectively. The fiber 44 is mounted in a curved groove 94 formed in an optically flat surface 98 of the substrate 90. Similarly, the fiber 66 is mounted in a curved groove 96 formed in an optically flat surface 100 of the substrate 92. The substrate 90 and fiber 44 mounted therein comprise a coupler half 102, and the substrate 92 and fiber 66 mounted therein comprise a coupler half 104.

The curved grooves 94, 96 each have a radius of curvature that is large compared to the diameters of the fibers 44, 66, which are ordinarily substantially identical. The widths of the grooves 94, 96 are slightly larger than the fiber diameters to permit the fibers 44, 66 to conform to the paths defined by the bottom walls of the grooves 94, 96, respectively. The depths of the grooves 94, 96 vary from a minimum at the center of the substrates 90, 92, respectively, to a maximum at the edges of the substrates 90, 92. The variation in groove depth permits the optical fibers 44, 66, when mounted in the grooves 94, 96, respectively, to gradually converge toward the centers and diverge toward the edges of the substrates, 90, 92, respectively. The gradual curvature of the fibers 44, 66 prevents sharp bends or other abrupt changes in direction of the fibers 44, 66 to avoid power loss through mode perturbation. The grooves 94, 96 may be rectangular in cross section; however, it is to be understood that other cross sectional configurations such as U-shaped or V-shaped may be used in forming the coupler 45.

At the centers of the substrates 90, 92, the depths of the grooves 94, 96 are less than the diameters of the fibers 44, 66. At the edges of the substrates 90, 92, the depths of the grooves 94, 96 are preferably at least as great as the fiber diameters. Fiber optic material is removed from each of the fibers 44, 66 by any suitable method, such as lapping, to form oval-shaped planar surfaces in the fibers 44, 66 that are coplanar with the confronting surfaces 98, 100 of the substrates 90, 92. The oval surfaces are juxtaposed in facing relationship to form an interaction region 105 wherein the evanescent field of light propagated by each of the fibers 44, 66 interacts with the other fiber. The amount of fiber optic material removed increases gradually from zero near the edges of the substrates 90, 92 to a maximum amount at the centers of the substrates 90, 92. The tapered removal of fiber optic material enables the fibers 44, 66 to converge and diverge gradually, which is advantageous for avoiding backward reflection and excessive loss of light energy at the interaction region 105.

Light is transferred between the fibers 44, 66 by evanescent field coupling at the interaction region 105. Optical fibers, such as the fibers 44, 66, comprises a central core 106 and a surrounding cladding 108. The core 106 has a refractive index that is greater than that of the cladding 108, and the diameter of the core 106 is such that light propagating within the core 106 internally reflects at the core-cladding interface. Most of the optical energy guided by the optical fiber 44 is confined to its core 106. However, solution of the wave equations for the fiber 106 and applying the well-known boundary conditions shows that the energy distribution, although primarily in the core 106, includes a portion that extends into the cladding and decays exponentially as the radius from the center of the fiber increases. The exponentially decaying portion of the energy distribution within the fiber 106 is generally called the evanescent field. If the evanescent field of the optical energy initially propagated by the fiber 44 extends a sufficient distance into the fiber 66, energy will couple from the fiber 44 into the fiber 66.

It has been found that to ensure proper evanescent field coupling, the amount of material removed from the fibers 44, 66 must be carefully controlled so that the spacing between the cores of the fibers 44, 66 is within a predetermined critical zone. The evanescent field extends a short distance into the cladding and decreases rapidly in magnitude with distance outside the fiber core. Thus, sufficient fiber optic material should be removed to permit overlap between the evanescent fields of waves propagated by the two fibers 44, 66 if too little material is removed, the cores will not be sufficiently close to permit the evanescent fields to cause the desired interaction of the guided waves; and therefore, insufficient coupling will result.

Conversely, removal of too much material alters the propagation characteristics of the fibers, resulting in loss of light energy from the fibers due to mode perturbation. However, when the spacing between the cores of the fibers 44, 66 is within the critical zone, each fiber 44, 66 receives a significant portion of the evanescent field energy from the other to achieve good coupling without significant energy loss. The critical zone includes the region in which the evanescent fields of the fibers 44, 66 overlap sufficient to provide good evanescent field coupling with each core being within the evanescent field of light guided by the other core. It is believed that for weakly guided modes, such as the $HE_{11}$ mode guided by single mode fibers, mode perturbation occurs when the fiber core is exposed. Therefore, the critical zone is the core spacing that causes the evanescent fields to overlap sufficiently to cause coupling without causing substantial mode perturbation induced power loss.

The extent of the critical zone for a particular coupler depends upon a number of factors, such as the parameters of the fibers and the geometry of the coupler. The critical zone may be quite narrow for a single mode fiber having a step index profile. The center-to-center spacing of the fibers 44 and 66 is typically less that 2 to three core diameters.

The fibers 44, 66 preferably have substantially identical core and cladding diameters, radius of curvature at the interaction zone 105 and have the same amount of fiber optic material removed therefrom to form the interaction region 105. The fibers 44, 66 are symmetrical through the interaction region 105 in the planes of the surfaces 98, 100, respectively, so that the facing planar oval surfaces of the fibers 44, 66 are coextensive when they are superimposed. The two fibers 44, 66 therefore have identical propagation characteristics at the interaction region, thereby avoiding reduction in coupling that is associated with dissimilar propagation characteristics. Each of the optical fibers 44, 66 has a propagation constant that determines the parameters, such as wavelength, reflection at interfaces and attenuation of waves propagating therein. It is well-known that energy couples between media having substantially identical propagation constants more easily than between media having different propagation constants.

The substrates 90, 92 may be fabricated of any suitably rigid material. In a preferred embodiment, the substrates 90, 92 comprise generally rectangular blocks of fused quartz glass approximately 1 inch long, 1 inch wide and 0.4 inch thick. The fibers 44, 66 may be secured in the curved grooves 94, 96 by a suitable cement (not shown) such as epoxy resin. The fused quartz substrates 90, 92 advantageously have a coefficient of thermal expansion similar to that of the fibers 44, 66, which is important in maintaining predetermined coupling characteristics if the substrates 90, 92 and the fibers 44, 66 are subjected to any heat treatment during manufacture or use. For some applications the the coupler 45 may comprise only the two fibers 44, 66 with the two oval regions being fused or bonded together without being retained in the substrates 90, 92.

The coupler 45 of FIGS. 1 and 6 includes four ports labeled 45A, 45B, 45C and 45D. Ports 45A and 45B, which are on the left and right sides, respectively, of the coupler 45 correspond to the fiber 44. The ports 45C and 45D, which are on the left and right sides, respectively, of the coupler 45 correspond to the fiber 66. For purposes of explanation it is assumed that an optical signal input is applied to port 45A through the fiber 44. The signal passes through the coupler 45 and is output at either one or both of ports 45B or 45C depending upon the amount of coupling between the fibers 44 and 66. The "coupling constant" is defined as the ratio of the coupled power to the total output power. In the above example, the coupling constant is the ratio of the power output at port 45D divided by the sum of the power output at the ports 45B and 45D. This ratio is sometimes called the "coupling efficiency", which is typically expressed as a percent. Therefore, when the term "coupling constant" is used herein, it should be understood that the corresponding coupling efficiency is equal to the coupling constant times 100.

The coupler 45 may be tuned to adjust the coupling constant to any desired value between zero and 1.0 by offsetting the confronting surfaces of the substrates 90, 92 to control the dimensions of the region of overlap of the evanescent fields of the fibers 44, 66. Tuning may be accomplished by sliding the substrates 90, 92 laterally or longitudinally relative to one another.

The coupler 45 is highly directional, with substantially all of the power applied at one side thereof being output at the ports on the other side. Substantially all of the light applied as an input to either ports 45A or 45C is delivered to ports 45B and 45D without appreciable contra-directional coupling. The directional characteristic is symmetrical in that some light applied to either ports 45B or 45D is delivered to ports 45A and 45B. The coupler 45 is essentially nondiscriminatory with respect to polarizations and preserves the polarization of light input thereto.

Light that is cross-coupled from one of the fibers 44, 66 to the other undergoes a phase shift of $\pi/2$, but light that passes straight through the coupler 45 without being cross-coupled is not shifted in phase. For example, if the coupler 45 has a coupling constant of 0.5, and an optical signal is input to port 45A, then the outputs at ports 45B and 45D will be of equal magnitude; but the output at port 45D will be shifted in phase by $\pi/2$ relative to the output at port 45B.

The coupler 45 is a low loss device, having typical insertion losses of about 0.1% to 0.2%. The term "insertion loss" as used herein refers to the real scattering losses of light energy passing through the coupler 45. For example, if light energy is input to port 45A; and the light energy output at ports 45B and 45D totals 97% of the input energy, the insertion loss is 3%. The term "coupler transmission" is defined as one minus the insertion loss and is typically expressed an a decimal fraction.

Mach-Zehnder Interferometer

A portion of the light input to port 45A of the coupler 45 is coupled from the fiber 44 into the fiber 66 and output from the coupler 45 at port 45D. The Mach-Zehnder interferometer 46 includes the pair of couplers 45 and 68 that couple light between the fiber 44 and the fiber 66. The lengths of the fiber 44 and the fiber 66 between the couplers 45 and 68 comprise the reference arm 60 and the sensing arm 62, respectively. In general, the reference arms 60 and the sensing arm 62 have different lengths. Light propagating in the reference arm 60 is called the reference signal, and light propagating in the sensing arm 62 is called the sensing signal. The coupler 68 couples a portion of the sensing signal back into the fiber 44 for output at port 68B while also coupling a portion of the reference signal into the sensing fiber 66 for output from the wavelength switched passive interferometric sensor system 20 at port 68D. A portion of the reference signal continues to be guided by the fiber 44 and propagates from port 68A to port 68B. The coupler 68 combines portions of the reference and sensing signals and produces an output signal at port 68B that is a superposition of portions of the reference and sensing signals. The result of combining the reference and sensing signals is the formation of an interference pattern between the reference and sensing signals at port 68B. This interference pattern is a function of the phase difference $\theta$ between the reference and sensing signals and is the output of the Mach-Zehnder interferometer 46 that is supplied to the detector 54.

The sensing arm 62 and the reference arm 60 may have quiescent lengths such that the sensing signal and the reference signal combine in phase in the coupler 68. The physical parameter, such as acoustic vibrations, to be measured is coupled to the sensor arm 62 by any convenient means, depending upon the parameter. Changes in the parameter while the reference arm 60 is isolated from changes in the parameter produce an optical path length change $\Delta L$ in the sensor arm 62, which causes a phase shift between the reference signal and the sensing signal. The Mach-Zehnder interferometer 46 may be calibrated so that changes in the sensed parameter may be quantitatively related to the amount of phase shift in the interference pattern.

If the light intensity propagating from port 45B of the coupler 45 toward port 68A of the coupler 68 is $I_o$, and the coupler 45 has a coupling efficiency of 50%, then the intensity at ports 45B and 45D will be $I_o/2$. The reference signal undergoes a phase shift $\theta_T$ while propagating from the the coupler 45 to the coupler 68. While propagating from the coupler 45 to the coupler 68, the sensing signal experiences a phase shift of $\theta_s(t)$, which is a function of the phase shift caused by the fiber 66 and fluctuations in the sensed physical parameter.

Michelson Interferometer

Figure 14:
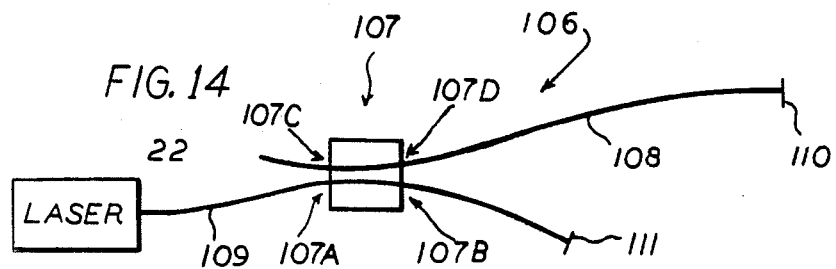
FIG. 14 schematically illustrates a fiber optic Michelson interferometer that may be employed as a sensor in the present invention.

Referring to FIG. 14, a Michelson interferometer 106 suitable for use as a sensor in the system 20 comprises a fiber optic directional coupler 107 and a sensing fiber 108 and a reference fiber 109. The sensing fiber 108 and the reference fiber 109 terminate in mirrors 110 and 111, respectively. Light from the laser 22 is input to one of the fibers, for example, the reference fiber 109, which guides the light to port 107A of the coupler 107. The coupler 107 couples part of the input light for output at port 107D into the sensing fiber 108, which is exposed to the physical parameter being monitored. The mirror 110 reflects the sensing signal back through the sensing fiber 108 to port 107D. Light that is not cross coupled into the sensing fiber 108 is output at port 107B and remains in the reference fiber 109 as a reference signal. The mirror 111 reflects the reference signal back to port 107B.

The coupler 107 combines the sensing and reference signals by coupling a portion of the reference signal into the sensing fiber 108. Combining the sensing and reference signals produces an interference pattern. The combined sensing and reference signals are output at port 107C and impinge upon the detector 54 for subsequent processing to determine the phase change in the sensing signal caused by exposure to the physical parameter.

Frequency Shifers

The frequency shifter 21 is preferably either the Bragg cell 24 shown in FIG. 2 or a serrodyne frequency shifter as shown in FIGS. 10-13.

Referring to FIG. 2, the Bragg cell 24, which is well-known in the optical arts, comprises a glass slab 26 driven by an acoustic transducer 28, which launches acoustic waves into the glass slab 26. Applying modulating signals of frequency $\omega_m$ to the acoustic transducer 28 controls the frequency of the acoustic waves in the glass slab 26. The acoustic wavefronts in the glass slab 26 function as a moving diffraction grating, which transmits a first portion 27A of the incident optical beam and reflects a second portion 27B. If the optical signal has frequency $\omega_o$, then the portion 27B of the beam reflected from the Bragg cell 24 has frequency $\omega_o + \omega_m$; and the transmitted portion of the beam has the original frequency $\omega_o$. In a typical Bragg cell, approximately 60% to 70% of the incident optical energy is reflected and shifted in frequency.

As shown in FIG. 2, the Bragg cell 24 receives an input signal from an HF amplifier 32, which amplifies the modulating signal. The output of the HF amplifier 32 is under the control of a pair of oscillators 34 and 36 that produce electrical signals of frequency $\omega_1$ and $\omega_2$. The signals output from the oscillators 34 and 36 are fed into a switch 38, which selectively inputs one of the signals of frequency $\omega_1$ or $\omega_2$ to the HF amplifier 32.

Figure 10A:
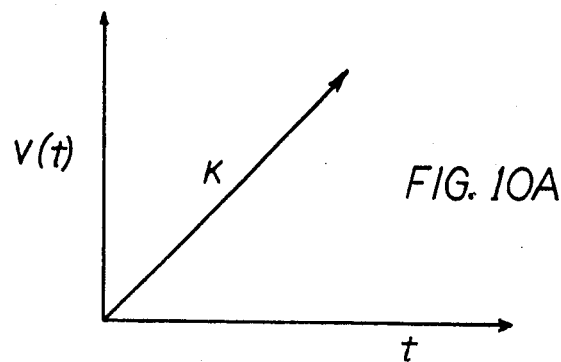
FIG. 10A illustrates a ramp voltage for driving a phase shift that may be included in FIG. 1.

The serrodyne technique of frequency shifting incorporates a linear optical phase shifter driven with a ramp signal. This ramp signal produces a linearly time varying phase shift, which is in essence, a frequency shift for the duration of the ramp. The optical frequency produced is determined by the time rate of change of the ramp and the scale factor of the phase shifter. FIG. 10A graphically illustrates a ramp voltage that increases linearly with time at a rate of K v/s.

Figure 10B:
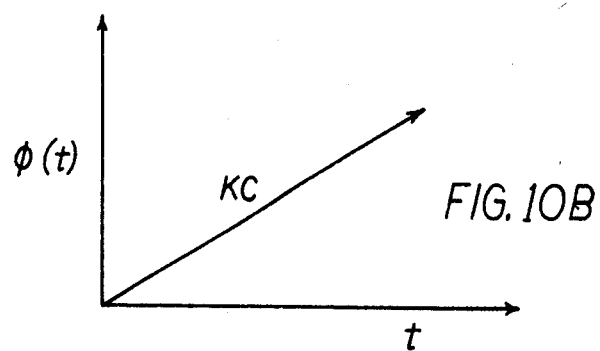
FIG. 10B illustrates the phase of an optical signal being shifted by a phase shifter driven by the ramp voltage of FIG. 10A.

FIG. 10B graphically illustrates the phase of an optical signal output from a modulator driven by the ramp voltage of FIG. 10A. The time rate of change of the phase is the frequency shift. Referring to FIG. 10B, therefore, the frequency shift is $d\theta(t)/dt = KC$, where C is the modulator scale factor. Three exemplary methods for implementing the serrodyne frequency shifting technique are described below with reference to FIGS. 11-13.

Referring to FIG. 11, a first serrodyne frequency shifting system 110 comprises an optical fiber 111 wrapped around a radially poled thin walled piezoelectric cylinder 112. Having the cylinder 112 radially poled means that the molecular electric fields in the piezoelectric material are oriented to point radially inward or radially outward in relation to the cylinder 112. For example, the fields may be oriented to point radially outward such that the cylinder 112 has an outer surface 113 that is at a negative potential relative to an inner surface 114. It is well known that application of a potential difference across a poled piezoelectric material will cause predictable dimensional changes therein. A voltage source 115 connected to suitable electrodes (not shown) on the surfaces 113 and 114 applies voltages across the piezoelectric material between the surfaces 113 and 114 to cause the radius of the cyinder 112 to vary linearly with time. The length of the fiber 111 varies proportionally with the variation in radius of the cylinder 112, thereby modulating the phase of an optical signal propagated by the fiber.

Referring to FIG. 12, a second type of serrodyne frequency shifting system 116 includes a piezoelectric cylinder 117 that includes a cavity 118 filled with an essentially incompressible fluid. An optical fiber 120 passes through the cylinder 117 generally in coaxial alignment therewith. The cylinder 117 is also radially poled so that application of voltage from the voltage source 115 across the interior and exterior thereof deforms the cylinder 117. A radially inward deformation of the cylinder 117 applies forces to the liquid 118, which transmits the forces to the fiber. The resulting strain on the fiber 120 changes the fiber refractive indices and, therefore, changes the phase of optical signals guided by the fiber 120.

Figure 13:
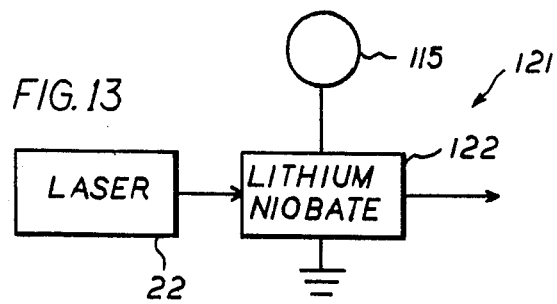
FIG. 13 is a simplified schematic diagram of a third serrodyne frequency shifting system including an electrooptically active material for receiving the output of an optical signal source.

A third type of serrodyne frequency shifting system 121 is shown in FIG. 13. Optical signals from the laser 22 of FIG. 1 are input to an electrooptically active material 122, which may be lithium niobate. Applying a voltage from the voltage source 115 to the electrooptically active material 122 changes the phase of optical signals propagating therein. The amount of phase change may be controlled by controlling the voltage V from the voltage source 115 that is applied to the electrooptically active material 122.

Method of Operation

If single mode propagation is assumed, the electric fields for the signal and reference arms can be modeled as plane waves and expressed mathematically as $$E_{1S} = A \exp[i(\omega_1 t + \theta_{SS} + \theta_a + \theta_{TS})] \quad (1)$$

and $$E_{1R} = B \exp[i(\omega_1 t + \theta_{SR} + \theta_{TR})], \quad (2)$$

where A and B are the scalar magnitudes of the electric fields in the sensing arm 62 and the reference arm 60, respectively; $\omega_1$ is the radian frequency of the optical field when the output of the oscillator 34 is input to the HF amplifier 32; $\theta_{SS}$ and $\theta_{SR}$ are the static phase shifts for the sensing arm 62 and the reference arm 60 for the the optical path length $\beta_1 L$, respectively; $\theta_{TS}$ and $\theta_{TR}$ are the thermal random phase shifts for the sensing arm 62 and the reference arm 60, respectively; $\beta_1$ is the propagation constant for the fibers 44, 66 for the optical signal having frequency $\omega_1$ and $\theta_a$ is the phase shift in the sensing signal by an acoustic wavefront that impinges upon the reference fiber 66.

The detector 54 is preferably a square law detector that produces an output s(t) that is a function of the incident light intensity. The detector output may therefore be expressed as $$s(t) = A^2 + B^2 + 2AB \cos(\theta_a + \theta_{S1} + \theta_{SR}) \quad (3)$$

where $\theta_{S1} = \theta_{SS} - \theta_{SR} = \beta_1 \Delta L$ with $\Delta L$ being the path length mismatch between the sensing arm 62 and the reference arm 60; and $\theta_T = \theta_{TR} - \theta_{TS}$.

Now if the frequency of the optical signal input to the Mach-Zehnder interferometer 46 is changed by actuating the switch 38 to apply the output of the oscillator 36 to the HF amplifier 32, the propagation constant of the fibers 44 and 66 changes from $\beta_1 = 2\pi n/\lambda_1$, where $\lambda_1$ is the free space optical wavelength corresponding to the frequency $\omega_1$ and n is the index of refraction of the fiber optic material, to a new value $\beta_2 = 2\pi n/\lambda_2$, where $\lambda_2$ is the free space optical wavelength corresponding to the frequency $\omega_2$. The new propagation constant $\beta_2$ results in a new phase difference $\theta_{S2}$ between the sensing and reference signals given by $$\theta_{S2} = \beta_2 \Delta L. \quad (4)$$

The phase differences $\theta_{S1}$, $\theta_{S2}$ and the propagation constants are related such that $$\pi/2 = \theta_{S2} - \theta_{S1} = (\beta_2 - \beta_1) L, \quad (5)$$

which reduces to $$\Delta \theta_S = \Delta \beta \Delta L = \pi/2, \quad (6)$$

where $\Delta \theta_S = \Delta \theta_{S2} - \Delta \theta_{S1}$ and $\Delta \beta = \beta_2 - \beta_1$. The path length mismatch $\Delta L$ is a constant; therefore the magnitude of the quantity $\Delta \beta \Delta L$ is adjusted to equal $\pi/2$ by changing the frequency of the optical signal.

Now since $\Delta \beta \Delta L$ is selected such that $\Delta \theta_S = \pi/2$, the output signal from the Mach-Zehnder interferometer 46 after the frequency shift $\Delta \omega$ from $\omega_1$ to $\omega_2$ will be in quadrature with the original output signal. This quadrature relation between the two output signals is desirable because the two signals can be processed to determine the phase shift between the sensing and reference signals. Since the phase shift is linearly proportional to the sound pressure level of the acoustic wave incident upon the sensing fiber, determination of the phase shift permits determination of the sound pressure level. The amount of optical frequency shift $\Delta f$ required to produce outputs that are in quadrature is calculated to be $$f = c/(4n\Delta L), \quad (7)$$

where c is the free space velocity of light, n is the refractive index of the optical fibers 44 and 66, and $\Delta L$ is the path length mismatch.

The inherent sensitivity and modulo $2\pi$ operation of interferometers in general and the Mach-Zehnder interferometer 46, in particular, provides significant difference from other types of sensors. Relatively small signals generate large phase shifts which degenerate to a value between zero and $2\pi$. The degeneracies may be counted as they occur, and the resulting degenerate phase may be measured with a measurement system of moderately low accuracy.

The advantages of such a system are exemplified by considering typical specifications of a marine streamer sensor used in underwater geophysical explorations. A ship tows air guns that release pressurized gas into the water to form a plane acoustic wave that propagates to the ocean floor where part of the wave reflects back toward the surface because the ocean water and the ocean floor have different acoustic impedances. A second reflection occurs at the interface between the air and the water surface. Part of the wave penetrates into the earth below the ocean floor and reflects from geological formations therein. Analysis of the reflections gives information concerning the location and size of mineral deposits below the ocean floor.

Acoustic sensors used in marine streamer applications must have a dynamic range of about 120 dB in order to provide the ability to detect and distinguish all of the relevant reflections. A linear system cannot have a dynamic range greater than its signal to noise ratio. Therefore a linear acoustic sensor for such applications must have a signal to noise ratio of 120 dB, or $10^{12}$, which is difficult to achieve in actual practice.

In order to construct the interferometric sensor system 20 to have the desired dynamic range, the maximum signal to be detected may be chosen to correspond to X/1,000,000 radians. If X is 1000 radians, the minimum signal to be detected is 1 milliradian, which may be measured with a relatively low resolution fiber interferometer such as the Mach-Zehnder interferometer 46. The ratio of the maximum signal to the minimum signal is $10^6$: 1 because the acoustic pressure is proportional to the square of the signal detected by the interferometer. Thus, a ratio of $10^6$: 1 for the maximum to minimum interferometer output signals corresponds to a ratio of $10^{12}$: 1 for the acoustic pressures. Measurement of the maximum phase change is implemented by counting the number of $2\pi$ degeneracies therein, which permits realization of a dynamic range of 120 dB, a resolution of $-120$ dB and high linearity with a moderately low resolution system. Therefore, the present invention, being nonlinear, provides the capability of extending the dynamic range beyond the signal to noise ratio by adding cycles of $n\pi$.

Figure 4:
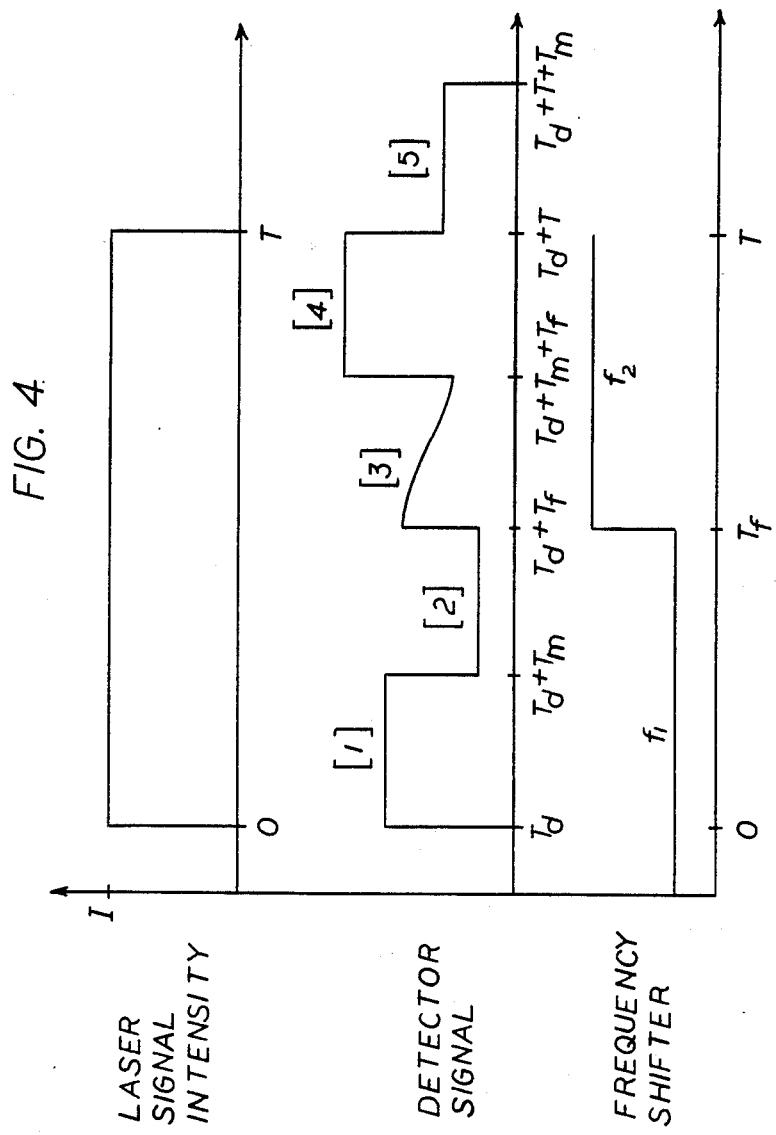
FIG. 4 graphically illustrates the intensity and frequency of the signal input to the Mach-Zehnder interferometer of FIG. 1 and the intensity of the signal propagated to the detecting means for a first demodulation scheme.

The graphs of FIG. 4 illustrate the basic principles of the invention. The output from the Bragg cell for input to the Mach-Zehnder interferometer 46 is shown to be an optical pulse 110 having a constant intensity in a time interval from $t=0$ to $t=T$. The optical pulse 110 initially has a frequency $\omega_1 = 2\pi f_1$, where $\omega$ is expressed in radians per second and $f_1$ is expressed in cycles per second. At a time $t=T_f$, the frequency of the optical signal shifts from $\omega_1$ to $\omega_2 = 2\pi f_2$. The second frequency $f_2$ is shown to be greater than the first frequency $f_1$ for purposes of illustration only. The interferometric sensor system 20 operates satisfactorily if the second frequency is greater than the first frequency.

The signal output from the photodetector 54 is shown to have five separate portions labelled [1]–[5] in FIG. 4. The first portion [1] begins at a time $T_d$, which is the delay time for the Mach-Zehnder interferometer 46 and exists for a time interval $T_m = \Delta Ln/c$, which is the time delay due to the path length mismatch. The portion [1] of the detector output signal has a constant magnitude $$[1] = B^2, \tag{8}$$

which is the reference signal intensity. It is assumed for simplicity that the reference signal does not change when the frequency of the optical signal input to the coupler 45 shifts. The reference arm 60 is in general shorter than the sensing arm 62. Therefore, after elapse of the delay time $T_d$ for the reference signal to traverse its optical path to the detector 54, the initial output of the Mach-Zehnder interferometer 46 is the reference signal. Of course, if the sensing arm 62 is shorter than the reference arm 60, then the initial output of the Mach-Zehnder interferometer 46 is the sensing signal.

The second portion [2] represents interference between the reference and sensing signals when the frequency of the optical signal input to the coupler 45 is the frequency $f_1$, graphically represented in FIG. 4. The second portion [2] begins at time $t=T_d+T_m$, which is the time required for the signal to propagate through the sensing arm 62. The second portion [2] exists until a time $t=T_d+T_f$, with $T_f$ being the time delay caused by the Bragg cell 24 or other optical frequency shifting device. The magnitude of the portion [2] of the detector signal is $$[2] = A^2 + B^2 + 2AB \cos \theta, \tag{9}$$

where $\theta = \theta_a + \theta_T + \theta_S$, which are defined above.

The third portion [3] of the detector output represents interference between an optical signal having frequency $f_2$ that has propagated through the reference arm 60 to the coupler 68 and a signal of frequency $f_1$ that has propagated to the coupler 68 through the sensing arm 62. Since the sensing arm 62 is selected to be longer than the reference arm 60, there is a time interval after the frequency shifter 21 shifts from the frequency $f_1$ to the frequency $f_2$ wherein the reference signal has the frequency $f_1$ and the sensing arm 62 has the frequency $f_2$. The third portion [3] of the detector output begins at time $t=T_d+T_f$ and exists until a time $t=T_d+T_m+T_f$, which is the delay from the path mismatch between the sensing fiber 66 and the reference fiber 64. The magnitude of the third portion of the detector output is $$[3] = A^2 + B^2 + 2AB \cos(\omega t + \theta). \tag{10}$$

The fourth portion [4] of the detector output represents interference between sensing and reference signals that both have the second frequency $f_2$. The fourth portion [4] of the detector output begins at time $t=T_d+T_m+T_f$ and exists until a time $t=T_d+T$. The intensity of the portion [4] of the detector output is $$[4] = A^2 + B^2 + 2AB \sin \theta. \tag{11}$$

The fifth portion [5] of the detector output represents the intensity of the sensing signal. At the fifth portion [5] of the detector output, the portion of the input having the second frequency has propagated completely through the system; but the sensing signal, having the longer optical path, remains in the system. Thus there is a time interval in which the only optical signal incident upon the detector is the sensing signal. The fifth portion [5] of the detector output begins at time $t=t_d+T$ and terminates at $t=T_d+T+T_m$. The intensity of the fifth portion [5] of the detector output is the intensity of the wave input to the Mach-Zehnder interferometer 46 and is $$[5] = A^2 \tag{12}$$

The total length of the signal output from the Mach-Zehnder interferometer 46 is given by $T_m+T=5T_m$, which gives $T=4T_m$ and $T_f=2T_m$. It is possible to use shorter pulse durations, which would result in shorter durations for the signals [2] and [4] from the detector 54. Shortening the pulse duration places more stringent requirements on the analog to digital converter used in digitally sampling the detector output.

Since the phase shifts for the optical inputs are in quadrature, the interference between the sensing and reference signals for the first pulse portion of frequency $f_1$ may be expressed as a function of the cosine of the phase angle; and the interference between the sensing and reference signals for the second pulse portion of frequency $f_2$ may be expressed as a function of the sine of the phase angle. The two interference terms may be solved for the tangent of the phase angle since the tangent of an angle is the ratio of the sine to the cosine. An algorithm for extracting the phase signal of the Mach-Zehnder interferometer 46 is $$\tan(\theta) = \{[4]-[5]-[1]\}\{[2]-[5]-[1]\}^{-1}, \quad (13)$$

where the value $\theta$ is determined from a tangent look up table that may be stored in a read only memory (not shown) that may be included in the demodulator 82.

Figure 5:
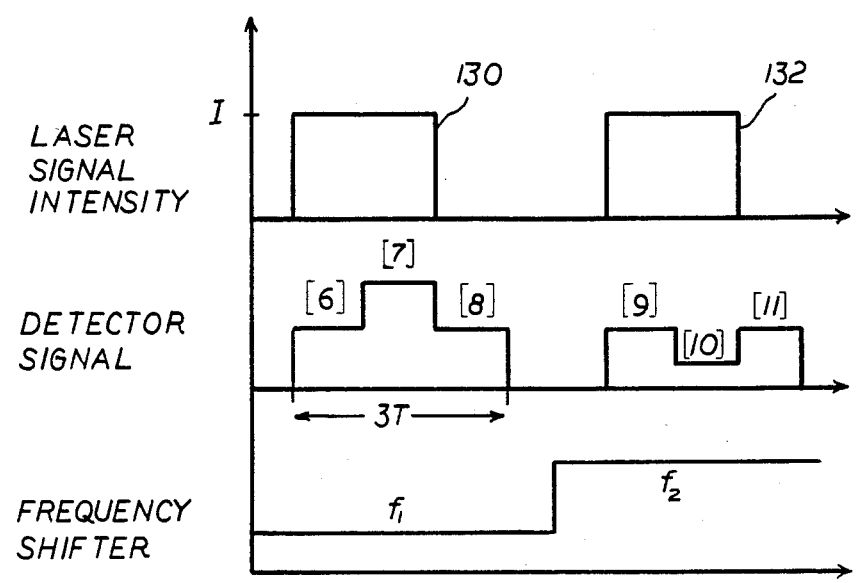
FIG. 5 graphically illustrates the intensity and frequency of the signal input to the Mach-Zehnder interferometer of FIG. 1 and the intensity of the signal propagated to the detecting means for a second demodulation scheme.

A second scheme for generating the phase of the sensing signal relative to the reference signal is shown in FIG. 5. A pair of pulses 130, 132 represents the intensity of the optical signal input to the Mach-Zehnder interferometer 56. The first pulse 130 of the optical signal has a first frequency $\omega_1$, and the second pulse 132 has a second frequency $\omega_2$. The detector output comprises six separate non-zero portions labelled [6]–[11] to avoid confusion with the portions [1]–[5] of the detector output signal for the demodulation scheme shown in FIG. 4. The first three portions [6]–[8] are produced by the detector 54 in response to the pulse 130 having the optical frequency $f_1$. The portion labeled [6] is the intensity of the reference signal for the input signal having frequency $f_1$, since the initial output of the Mach-Zehnder interferometer 45 is the reference signal. The portion labeled [7] represents interference between the sensing and reference signals and the portion [8] represents the intensity of the sensing signal for the first pulse 130. The first three portions [6]–[8] are contiguous and each have a duration of $T = \Delta L n/c$, which is the delay caused by the mismatch in path length between the sensing arm 62 and the reference arm 60.

The second three portions [9]–[11] are the detector response to the second pulse 132. The second three portions [9]–[11] are contiguous and also each have a duration of T. The portions [9], [10] and [11] of the detector output represent the reference signal intensity, interference between the reference and sensing signals, and the sensing signal intensity, respectively.

The intensities of the portions [6]–[11] are as follows:

$$[6] = B^2 \quad (14)$$

$$[7] = A^2 + B^2 + 2AB \cos \theta \quad (15)$$

$$[8] = A^2 \quad (16)$$

$$[9] = D^2 \quad (17)$$

$$[10] = C^2 + D^2 + 2CD \sin \theta \quad (18)$$

$$[11] = C^2, \quad (19)$$

where A and B are the amplitudes of the electric fields input to the sensing arm 62 and the reference arm 60, respectively, from the first input pulse 130, and C and D are the amplitudes of the electric fields input to the sensing arm 62 and the reference arm 60, respectively, from the second input pulse 132. The angle $\theta$ may be ascertained by determining the constants A, B, C and D and solving Equations (15) and (18) for the tangent of the angle. An algorithm for determining the tangent of the angle is $$\tan \theta = \{[10]-[11]-[9]\}\{[8][6]\}^{\frac{1}{2}}\{[7]-[8]-[6]\}^{-1}\{[11][9]\}^{-\frac{1}{2}} \quad (20)$$

The angle $\theta$ may be determined from a tangent look up table as described above. Both the first and second algorithms use the tangent of the angle, rather than the sine or cosine, to find the phase change because the sine and cosine curves both have substantial portions where the curves have variations that are so small that accurate measurements are difficult. The tangent function has no variations that are as small as those near the maxima and minima of the sine and cosine functions. As explained in detail subsequently the cotangent, which is the reciprocal of the tangent, is used to determine the phase angle when the cosine is less than the sine.

If the detector signals [6], [8], [9] and [11] are of equal magnitude, then Equation (20) becomes $$\tan \theta = \{[10]-[11]-[4]\}\{[7]-[8]-[6]\}^{-1} \quad (21)$$

The time interval between the first and second pulse portions 130 and 132 is small compared to the time interval required for significant changes in both the phase angle between the sensing and reference signals and the background noise of the system. The change in phase angle is related to the physical parameter being monitored; therefore, there is no appreciable change in the parameter during the time interval between the pulses 130 and 132. Significant changes in either the parameter or the background noise would degrade the accuracy of measurements of the parameter.

If the phase of the Mach-Zehnder interferometer 46 shifts more than $\pi$ radians between data samples, it will be impossible to determine the polarity of the rate of change of the detected signal, which imposes a constraint on the operational characteristics of the equation (20).

The constraint is most easily recognized as a slew rate limit and is contingent on the sampling rate and the frequencies and magnitudes of the optical input signals.

The phase to be detected by the Mach-Zehnder interferometer 46 may be represented as $$\theta(t) = K \sin(\omega t), \quad (22)$$

where K is the magnitude of the phase excursion and $\omega$ is the radian frequency of the acoustic signal. The time derivative of the phase signal $\theta(t)$ is the rate of change, or slew rate, of the acoustic signal and is given by $$d\theta(t)/dt = \omega K \cos(\omega t) \quad (23)$$

The slew rate has a maximum value of $\omega K$, which occurs when $\cos(\omega t) = 1$. If N is the number of times the detector signal is sampled per second, then the maximum allowable signal level for the Mach-Zehnder interferometer is $$K_{max} = N\pi/\omega \quad (24)$$

Figure 8:
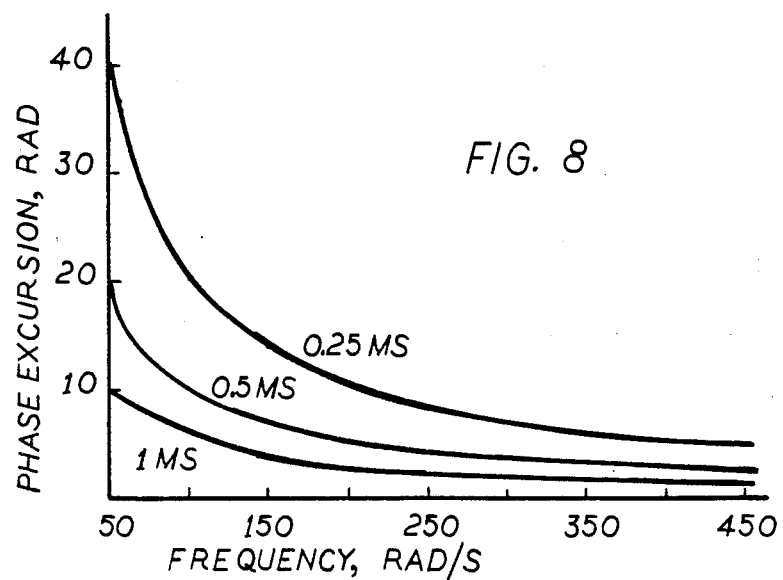
FIGS. 8 and 9 are graphs of the maximum phase shift between sensing and reference signals in the interferometer of FIG. 1 as a function of the frequency of an acoustic signal applied to the sensing fiber for various rates of sampling the interferometer output.
Figure 9:
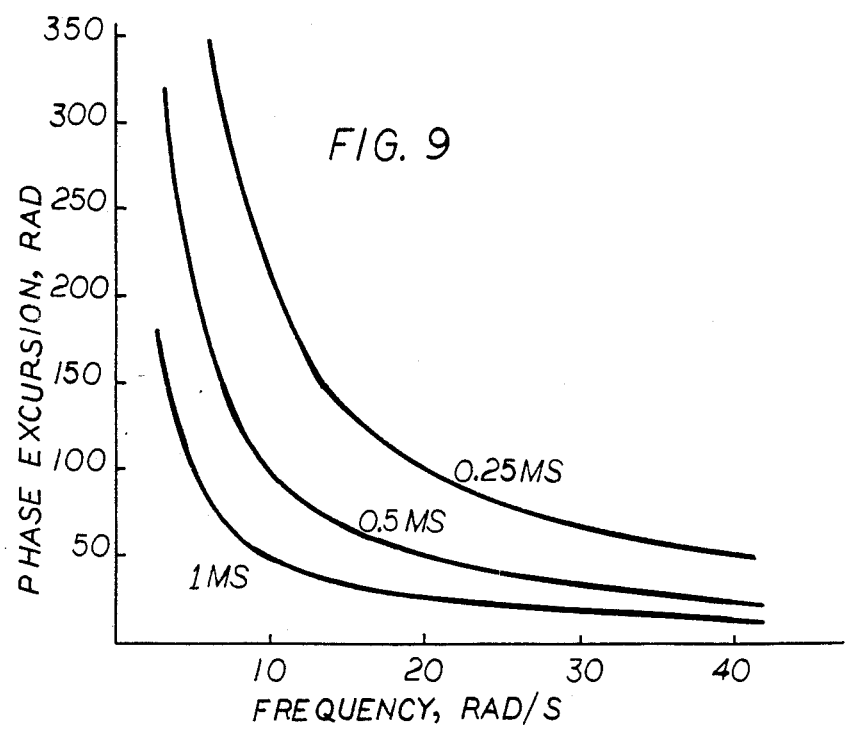

FIGS. 8 and 9 depict variations in $K_{max}$ with frequency for various values of the sampling rate N. The labels 1 MS, 0.5 MS and 0.25 MS associated with the curves of FIGS. 8 and 9 represent the time interval, 1/N, between successive samples. It should be noted that if $N=1000/s$, then at 500 Hz, $K_{max}$ is only one per radian; but at 3 Hz, $K_{max}$ is 167 per radian.

It has been assumed that the incident light propagates in the y-direction as shown on the coordinate axes in FIG. 1 with the wave being linearly polarized along a line that makes an angle of 45° with the x and z-axes. The polarization is the direction of the electric field vector E associated with the light wave. Ordinary single mode optical fiber has a substantial amount of birefringence, which means that such fibers have propagation constants that are polarization dependent. The birefringence causes a phase shift between the polarization components of a wave. Therefore, it is necessary to include some means for controlling the polarization of the reference signal in order to obtain the desired interference pattern output from the Mach-Zehnder interferometer 46. Ordinary fiber bent into an arc having a radius of 0.75 inch has a birefringence of about $\pi$ rad/meter, which may be employed to match the polarizations of the sensing and reference signals. Other polarization controlling methods known in the fiber optics art may also be employed.

Table 1 lists requirements for a wavelength switched passive interferometric sensor 20 for various optical path lengths.

TABLE 1

| | | Sensor Characteristics | | | |
|---|---|---|---|---|---|
| A/D rate (MHz) | mismatched path length (meters) | return signal duration (nsec) | freq. shift (MHz) | required delay length (meters) | sample rate per second for 1000 sensors |
| 200 | 1 | 25 | 50 | 5 | 40,000 |
| 40 | 5 | 125 | 10 | 25 | 8000 |
| 20 | 10 | 250 | 5 | 50 | 4000 |
| 13 | 15 | 375 | 3.3 | 75 | 2670 |
| 10 | 20 | 500 | 2.5 | 100 | 2000 |

Figure 7:
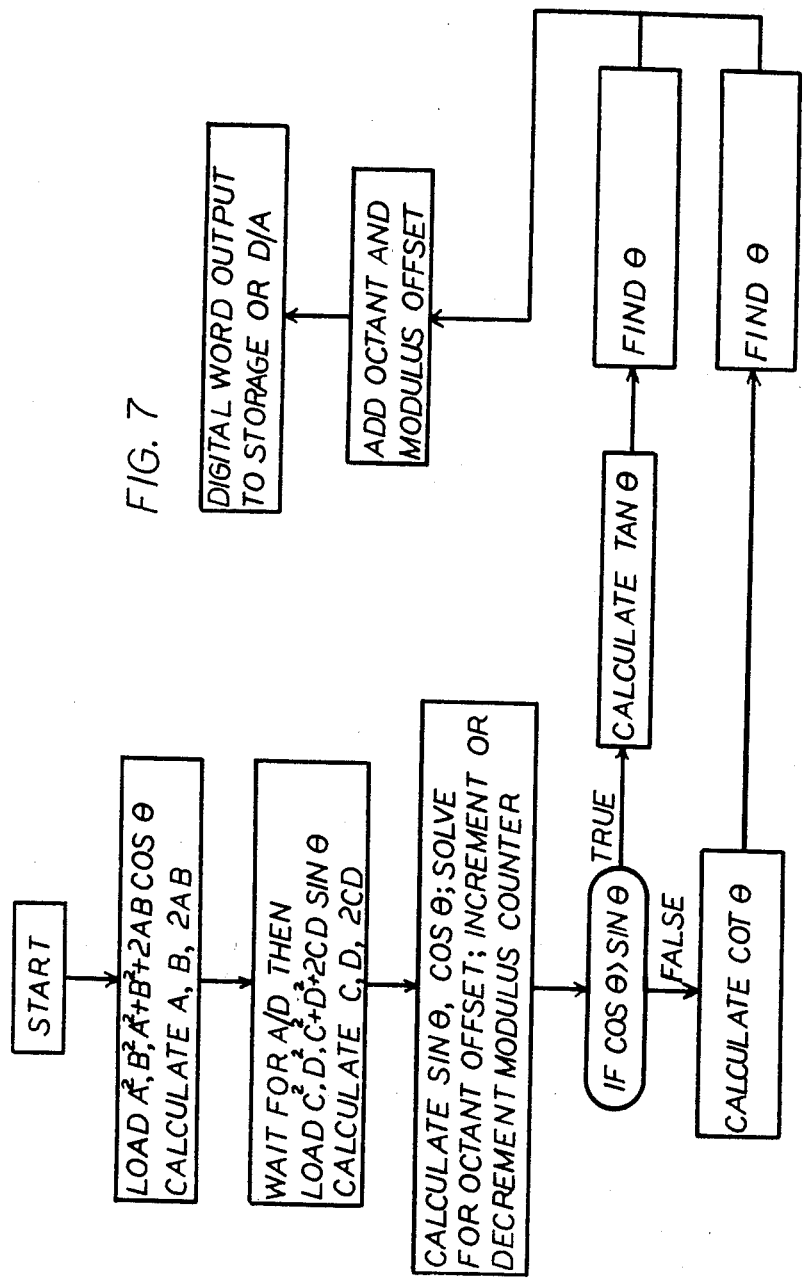
FIG. 7 is a flow chart illustrating steps in the demodulation algorithm for determining the phase difference between signals output from the Mach-Zehnder interferometer.

FIG. 7 is a flow chart of a demodulation algorithm that may be employed to obtain the phase angle $\theta$ from the data shown graphically in FIGS. 4 and 5. Any suitable digital computing means (not shown) may be included in the demodulator 82 of the passive wavelength switched interferometer system 20 to implement the demodulation algorithm.

After the system is started, signals indicative of the values of the measurements of $A^2$, $B^2$, and $A^2+B^2+2AB\cos\theta$, which correpond to an input signal of the first frequency, are loaded from the digital sampling and storage device 80 into the computing means, which then calculates the values of A, B and 2AB. The computer then waits for signals from the digital sampling and storage device 80 corresponding to input signals of the second frequency. The amplitude of the pulse having the second frequency may differ from that of the pulse having the first frequency; therefore the measurements corresponding to the input signal of the second frequency may be written as $C^2$, $D^2$, and $C^2+D^2+2CD\sin\theta$. After receiving the second set of signals, the computer calculates the values of C, D and 2CD.

The system then calculates $\sin\theta$, $\cos\theta$, and solves for the octant offset to determine which of the two trigonometric functions is the greater. A modulus counter is incremented or decremented to record the number of $2\pi$ radians through which the phase angle has changed, which is necessary because of the degeneracy of the sine and cosine functions. If $\cos\theta > \sin\theta$, the system calculates $\tan\theta$ and determines the angle $\theta$ from a table of tangents. If $\cos\theta < \sin\theta$, the system calculates $\cot\theta$ and determines the angle $\theta$ from a cotangent table. The cosine is greater than the sine in the first, fourth, fifth and eighth octants, and the cosine is less than the sine in the remaining octants. After determining the angle $\theta$, the system adds to the angle $\theta$ a number of radians corresponding to the octant plus the modulus offset, or integral number of $2\pi$ radians through which the phase angle $\theta$ has changed. The system stores the digital signal indicative of the total change in phase angle in a suitable digital mass storage unit, such as a magnetic tape or disc unit well known in the art, and provides an output to the digital to analog converter 86 so that the change in phase may be monitored on any suitable analog device, such as the oscilloscope 89.

The present invention provides significant advantages over previously known sensing systems. The sensing system 20 of the present invention provides a dynamic range that is larger than the signal to noise ratio of the optical components included therein, in contrast to linear sensing systems wherein the dynamic range cannot be greater than the signal to noise ratio. The sensing system 20 is nonlinear since it samples by counting cycles that are integral multiples of $\pi$ radians and then measuring the incremental phase difference above $\pi$ radians, where n is the number of cycles. The dynamic range may be expanded by increasing the number of cycles that may be counted. In particular, an acoustic sensor embodying the principles of the present invention may have a signal to noise ratio that is one thousand times the signal to noise ratio of the sensing interferometer. The invention may provide, for example, a system signal to noise ratio of $10^6$ with optical components having a signal to noise ratios of $10^3$, which is easily realizable with fiber optic couplers and fiber optic interferometers.

What is claimed is:

1. A sensor system for sensing changes in a physical parameter, comprising:
   an interferometer, said interferometer including a reference arm for propagating a reference signal, said reference arm being isolated from the physical parameter, said interferometer including a sensing arm for propagating a sensing signal, said sensing arm being exposed to the physical parameter, said sensing signal having an initial phase relation to said reference signal, said sensing arm producing a phase change in said sensing signal relative to said reference signal in response to changes in the physical parameter;
   means for supplying a sequence of optical pulses for input to said reference arm and said sensing arm of said interferometer, said means including an input optical fiber;
   means for shifting the frequency of said optical pulses such that each said sequence includes a first pulse portion having a first optical frequency and a second pulse portion having a second optical frequency, said first and second pulse portions producing first and second phase differences between said sensing signal and said reference signal, said first and second phase differences being in quadrature with one another; and
   means for processing said first and second pulse portions to determine the change in phase between the sensing signal and the reference signal to measure changes in the physical parameter.

2. The sensor system of claim 1 wherein said frequency shifting means forms each optical pulse to have both a first and second pulse portion; said first and second pulse portions having equal magnitudes.

3. The sensor system according to claim 2 wherein said means for determining the change in phase between the sensing signal and the reference signal to measure changes in the physical parameter comprises:
means for storing a first signal indicative of the reference signal intensity;
means for storing a second signal dependent upon the reference signal intensity, the sensing signal intensity, and the cosine of the phase angle between the sensing and reference signals created by the interference pattern of the reference signal and the sensing signal for an optical signal having the first optical frequency;
means for determining the duration of a third signal indicative of interference between a portion of the reference signal having the second optical frequency and a portion of the sensing signal having the first optical frequency;
means for storing a fourth signal dependent upon the reference signal intensity, the sensing signal intensity, and the sine of the phase angle between the sensing and reference signals created by the interference pattern of the reference signal and the sensing signal for an optical signal having the second optical frequency;
means for storing a fifth signal indicative of the sensing signal intensity; and
means for processing the signals to determine the phase angle between the sensing and reference signals.

4. The sensing system of claim 3 wherein the sensing and reference signals have a first phase difference of $\theta$ for the first pulse portion and a second phase difference of $\Delta\theta + \theta$ for the second pulse portion, the first and second pulse portions having a frequency difference and the sensing and reference arms having a length difference such that $\Delta\theta = \pi/2$.

5. The sensing signal of claim 4 wherein said processing means includes computing means for computing the tangent of the phase angle according to the equation $$\tan \theta = \{[4]-[5]-[1]\}\{[2]-[5]-[1]\}^{-1},$$

where [1], [2], [4] and [5] are said first, second, fourth and fifth signals, respectively.

6. The sensor system of claim 5 wherein the first pulse portion and the second pulse portion are separated in time to form a pair of separate pulses of different frequency.

7. The sensor system of claim 6 wherein the time separation of the first and second pulse portions is less than the time for the background noise level to change significantly relative to the physical parameter being sensed.

8. The sensor system of claim 5, wherein said first and second pulse portions have substantially identical amplitudes.

9. A sensing system according to claim 5 wherein said means for determining the change in phase between the sensing signal and the reference signal to measure changes in the physical parameter comprises:
means for storing a sixth signal indicative of the reference signal intensity for the first pulse portion;
means for storing a seventh signal dependent upon the reference signal intensity, the sensing signal intensity, and the cosine of the phase angle between the sensing and reference signals created by the interference pattern of the reference signal and the sensing signal for the first pulse portion;
means for storing an eighth signal indicative of the sensing signal intensity for the first pulse portion;
means for storing a ninth signal indicative of the reference signal intensity for the second pulse portion;
means for storing a tenth signal dependent upon the reference signal intensity, the sensing signal intensity, and the sine of the phase angle between the sensing and reference signals created by the interference pattern of the reference signal and the sensing signal for an optical signal having the second optical frequency;
means for storing an eleventh signal indicative of the sensing signal intensity for the second pulse portion; and
means for processing the signals [6]-[11] to determine the phase angle between the sensing and reference signals.

10. The sensing system of claim 9 wherein the sensing and reference signals have a first phase difference of $\theta$ for the first pulse portion and a second phase difference of $\Delta\theta + \theta$ for the second pulse portion, the first and second pulse portions having a frequency difference and the sensing and reference arms having a length difference such that $\Delta\theta = \pi/2$.

11. The sensing system of claim 10 wherein said processing means includes computing means for computing the tangent of the phase angle according to the equation $$\tan \theta = \{[10]-[11]-[9]\}\{[8][6]\}^{\frac{1}{2}}\{[7]-[8]-[6]\}^{-1}\{[11][9]\}^{-\frac{1}{2}},$$

where [6], [7], [8], [9], [10] and [11] are said sixth through eleventh signals, respectively.

12. The sensor system of claim 1 wherein said interferometer comprises a Mach-Zehnder interferometer.

13. The sensor system of claim 12 wherein said reference arm comprises a reference optical fiber and said sensing arm comprises a sensing optical fiber.

14. The sensor system of claim 12 further including:
a first fiber optic evanescent field coupler for supplying said sequence of optical pulses to said sensing optical fiber and reference optic fibers, said input optical fiber forming an input port and one of said sensing or reference optical fibers forming a first output port of said first fiber optic evanescent field coupler, the other of said sensing or reference optical fibers forming a second output port of said first fiber optic evanescent field coupler, said first fiber optic evanescent field coupler being formed to divide an optical signal input to said input port between said first and second output ports; and
a second fiber optic evanescent field coupler connected to said reference and sensing optical fibers for recombining said sensing and reference signals to produce an interference signal.

15. The sensor system of claim 1 further comprising:
a transmit fiber for transmitting optical signals;
a plurality of Mach-Zehnder interferometers each having an input coupled to said transmit fiber; and
a receive fiber coupled to said plurality of Mach-Zehnder interferometers for carrying signals output therefrom to said detector means.

16. A method for sensing changes in a physical parameter, comprising the steps of:
  coupling a reference signal into a reference arm of an interferometer;
  isolating the reference arm from the physical parameter;
  coupling a sensing signal into a sensing arm of the interferometer such that the sensing signal has an initial phase relation to said reference signal;
  exposing the sensing arm to the physical parameter to produce a phase change in the sensing signal relative to the reference signal in response to changes in the physical parameter;
  supplying a sequence of optical pulses for input to the reference arm and the sensing arm of said interferometer;
  shifting the frequency of the optical pulses such that each sequence includes a first pulse portion having a first optical frequency and a second pulse portion having a second optical frequency, the first and second pulse portions producing first and second phase differences between said sensing signal and said reference signal so that the first and second phase differences are in quadrature with one another; and
  processing said first and second pulse portions to determine the change in phase between the sensing signal and the reference signal to measure changes in the physical parameter.

17. The method of claim 16 further including the step of forming the first and second pulse portions to have equal amplitudes.

18. The method of claim 17 wherein the step of determining the change in phase between the sensing signal and the reference signal to measure changes in the physical parameter comprises the steps of:
  storing a first signal indicative of the reference signal intensity;
  storing a second signal dependent upon the reference signal intensity, the sensing signal intensity, and the cosine of the phase angle between the sensing and reference signals created by the interference pattern of the reference signal and the sensing signal for an optical signal having the first optical frequency;
  determining the duration of a third signal indicative of interference between a portion of the reference signal having the second optical frequency and a portion of the sensing signal having the first optical frequency;
  storing a fourth signal dependent upon the reference signal intensity, the sensing signal intensity, and the sine of the phase angle between the sensing and reference signals created by the interference pattern of the reference signal and the sensing signal for an optical signal having the second optical frequency;
  storing a fifth signal indicative of the sensing signal intensity; and
  processing the signals to determine the phase angle between the sensing and reference signals.

19. The method of claim 18 including the step of adjusting the first and second optical frequencies and the lengths of the sensing and reference arms so that the sensing and reference signals have a first phase difference of $\theta$ for the first pulse portion and a second phase difference of $\Delta\theta + \theta$ for the second pulse portion, such that $\Delta\theta = \pi/2$.

20. The method of claim 19 wherein the processing step includes computing the tangent of the phase angle according to the equation $$\tan\theta = \{[4]-[5]-[1]\}\{[2]-[5]-[1]\}^{-1},$$

where [1], [2], [4] and [5] are said first, second, fourth and fifth signals, respectively.

21. The method of claim 16 further including the step of separating the first pulse portion and the second pulse portion in time to form a pair of separate pulses of different frequency.

22. The method of claim 21 including the step of separating the first and second pulse portions by a time interval less than the time for the background noise level to change significantly relative to the physical parameter being sensed.

23. The method of claim 22 wherein the step of determining the change in phase between the sensing signal and the reference signal to measure changes in the physical parameter comprises the steps of:
  storing a sixth signal indicative of the reference signal intensity for the first pulse portion;
  storing a seventh signal dependent upon the reference signal intensity, the sensing signal intensity, and the cosine of the phase angle between the sensing and reference signals created by the interference pattern of the reference signal and the sensing signal for the first pulse portion;
  storing an eighth signal indicative of the sensing signal intensity for the first pulse portion;
  storing a ninth signal indicative of the reference signal intensity for the second pulse portion;
  storing a tenth signal dependent upon the reference signal intensity, the sensing signal intensity, and the sine of the phase angle between the sensing and reference signals created by the interference pattern of the reference signal and the sensing signal for an optical signal having the second optical frequency;
  storing an eleventh signal indicative of the sensing signal intensity for the second pulse portion; and
  processing the signals to determine the phase angle between the sensing and reference signals.

24. The method of claim 23 including the step of adjusting the first and second optical frequencies and the sensing and reference arms so that the sensing and reference signals have a first phase difference of $\theta$ for the first pulse portion and a second phase difference of $\Delta\theta + \theta$ for the second pulse portion, such that $\Delta\theta = \pi/2$.

25. The sensing system of claim 24 wherein the processing step includes computing the tangent of the phase angle according to the equation $$\tan\theta = \{[10]-[11]-[9]\}\{[8][6]\}^{\frac{1}{2}}\{[7]-[8]-[6]\}^{-1}\{[11][9]\}^{-\frac{1}{2}},$$

where [6], [7], [8], [9], [10] and [11] are said sixth through eleventh signals, respectively.

26. The method of claim 16 including the step of forming the interferometer to be a Mach-Zehnder interferometer.

27. The method of claim 26 including the steps of:
  forming the reference arm of a reference optical fiber; and forming the sensing arm of a sensing optical fiber.

28. The method of claim 27 further including the steps of:

supplying the sequence of optical pulses to the sensing optical fiber and the reference optical fiber with a first fiber optic evanescent field coupler; and combining the reference and sensing signals in a second fiber optic evanescent field coupler to produce an interference signal.

29. The method of claim 16 further comprising the steps of:

transmitting optical signals to a plurality of interferometers with a transmit fiber;

coupling signals output from the plurality of interferometers to a receive fiber; and detecting the signals output from the plurality of interferometers.

* * * * *